(12) United States Patent
Liu et al.

(10) Patent No.: US 9,642,110 B2
(45) Date of Patent: May 2, 2017

(54) GPS AND WLAN HYBRID POSITION DETERMINATION

(71) Applicant: Marvell World Trade Ltd., St. Michael (BB)

(72) Inventors: BoChih Liu, Shanghai (CN); Zhike Jia, Fremont, CA (US); Fagen Zhou, Shanghai (CN); Jian Chen, Shanghai (CN); Jing Yu, Shanghai (CN); Xing Zhao, Beijing-Shi (CN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/253,467

(22) Filed: Apr. 15, 2014

(65) Prior Publication Data

US 2014/0335887 A1     Nov. 13, 2014

Related U.S. Application Data

(60) Provisional application No. 61/841,613, filed on Jul. 1, 2013, provisional application No. 61/821,527, filed on May 9, 2013.

(51) Int. Cl.
| | | |
|---|---|---|
| *H04W 64/00* | (2009.01) | |
| *H04W 4/02* | (2009.01) | |
| *G01S 19/48* | (2010.01) | |

(52) U.S. Cl.
CPC ............. *H04W 64/00* (2013.01); *G01S 19/48* (2013.01); *H04W 4/02* (2013.01)

(58) Field of Classification Search
CPC ........ G01S 19/00; G01S 19/48; H04W 64/00; H04W 4/02; H04W 24/00; H04W 24/02;
(Continued)

(56) References Cited

U.S. PATENT DOCUMENTS 7,313,402 B1 * 12/2007 Rahman ................ H04W 24/06
455/456.1
9,026,135 B2 * 5/2015 Takahashi ............... G01S 19/25
455/456.1

(Continued)

OTHER PUBLICATIONS

Authorized Officer Sylvia Lampreia, Invitation to Pay Additional Fees, International Application No. PCT/US2014/034568, mailed Nov. 21, 2014, 6 pages.

*Primary Examiner* — Matthew Sams

(57) ABSTRACT

The present disclosure provides a method for determining a real-time position of a mobile device using a global positioning system (GPS) and wireless local area network (WLAN) hybrid positioning mode. The method includes determining, by a mobile device, the mobile device's environment area based on GPS satellite signals; determining an absolute position of the mobile device based on the GPS satellite signals while the mobile device is moving from an outdoor area to an indoor area; estimating a reference position of the mobile device based on the determined absolute position and WLAN access point signals while moving to a shadow area; and while moving to an indoor area, determining an estimated position of the mobile device based on calculated regressive coefficients and the WLAN access point signals, and updating the estimated position of the mobile device based on motion information and indoor floor map information.

31 Claims, 5 Drawing Sheets

(58) Field of Classification Search
CPC ..... H04W 24/06; H04W 24/08; H04W 4/027; H04W 4/028; H04W 4/04; H04W 4/22; H04W 76/007; H04W 84/045; G01C 21/206; G01C 21/10; G01C 21/16
See application file for complete search history.

(56) References Cited

U.S. PATENT DOCUMENTS

| | | | |
|---|---|---|---|
| 2005/0130677 A1 | 6/2005 | Meunier | |
| 2005/0253755 A1 | 11/2005 | Gobara | |
| 2006/0030334 A1* | 2/2006 | Hashimoto | G01C 21/005 455/456.1 |
| 2006/0119476 A1 | 6/2006 | Hope | |
| 2007/0049295 A1* | 3/2007 | Soliman | G01S 5/0252 455/456.3 |
| 2007/0243829 A1* | 10/2007 | Nagato | H04W 24/08 455/67.11 |
| 2009/0196267 A1* | 8/2009 | Walker, Sr. | G01S 19/48 370/338 |
| 2009/0291641 A1* | 11/2009 | Sato | H04M 1/72522 455/67.11 |
| 2011/0018732 A1 | 1/2011 | Cho | |
| 2011/0189960 A1* | 8/2011 | Bhattacharya | H04B 17/00 455/67.11 |
| 2011/0316880 A1* | 12/2011 | Ojala | G06T 19/006 345/633 |
| 2012/0221244 A1* | 8/2012 | Georgy | G01C 21/165 701/472 |
| 2013/0237245 A1* | 9/2013 | Tinnakornsrisuphap | H04W 64/00 455/456.1 |
| 2014/0004876 A1 | 1/2014 | Fuller | |
| 2014/0114568 A1* | 4/2014 | Park | G01S 19/48 701/469 |
| 2014/0149069 A1* | 5/2014 | Kelly | G01C 21/16 702/150 |
| 2014/0278084 A1 | 9/2014 | Lau | |
| 2014/0335887 A1* | 11/2014 | Liu | G01S 19/00 455/456.1 |
| 2015/0264534 A1* | 9/2015 | Liu | H04W 4/04 455/456.1 |

\* cited by examiner

GPS AND WLAN HYBRID POSITION DETERMINATION

CROSS REFERENCE TO RELATED APPLICATIONS

This disclosure claims the benefit of priority under 35 U.S.C. §119(e) of U.S. Provisional Application No. 61/841,613, filed Jul. 1, 2013, and U.S. Provisional Application No. 61/821,527, filed May 9, 2013, the disclosures of which are hereby incorporated by reference in their entirety.

FIELD OF USE

The present disclosure relates to determining a real-time position of a mobile device.

BACKGROUND

A mobile device can include one or more location-aware applications that are configured to perform location-based tasks such as store finding and transit routing. Location-aware applications can determine a position of a mobile device using a satellite positioning system receiver in the mobile device to specify a real-time position of the mobile device from only signals from satellites. Satellite-based positioning can provide high accuracy, but may require a positive line of sight between satellites and the mobile device. In outdoor areas where satellite positioning signals seldom are obstructed, the mobile device can receive sufficient line-of-sight signals from satellites. However, satellite-based positioning may be less effective while a mobile device is within indoor areas. In indoor areas, a wireless local area network (WLAN) transceiver in a mobile device can be used to specify a real-time position of the mobile device from only signals from WLAN access points. WLAN-based positioning is suitable for positioning in an indoor area and requires minimal investment because it makes use of an existing wireless infrastructure.

SUMMARY

A mobile device can incorporate functions of a satellite positioning system receiver and a WLAN transceiver. When a mobile device continuously moves from the outdoors to the indoors, the position of the mobile device can be determined in areas where satellite positioning signals are obstructed, such as in buildings. A hybrid positioning mode can be used to seamlessly determine the position of the mobile device. The hybrid positioning mode is configured to treat a WLAN access point as a signal emission source when satellites are not available. According to one aspect, a method for providing position information for a moving mobile device comprises determining, by the mobile device, the mobile device's environment area based on global positioning system (GPS) signals as the mobile device moves from an outdoor area to an indoor area (e.g., a building). The areas of the outdoors, shadow, and indoors can be traced during the movement of the mobile device.

According to another aspect, a method for providing position information for a moving mobile device comprises determining the absolute positions of the mobile device based on received GPS satellite signals while in both outdoor areas and shadow areas; estimating the reference positions of the mobile device based on the determined absolute positions and the received wireless local area network (WLAN) (e.g., WiFi) access point signals while in shadow areas; determining the estimated positions of the mobile device based on the calculated regressive coefficients and the received WLAN access point signals while in indoor areas, wherein the regressive coefficients are calculated based on modeling the determined absolute positions and estimated reference positions by linear regression and are optimized by an iterative method; and continuously updating the estimated positions of the mobile device based on the motion information and indoor floor map information to trace the mobile device's trajectory.

According to yet another aspect, a mobile device comprises a GPS receiver for receiving GPS satellite signals; a WLAN transceiver for measuring WLAN access point signals; a GPS position manager for determining an absolute position of the mobile device in an outdoor area and a shadow area; and a WLAN position manager for estimating an reference position of the mobile device in a shadow area, determining an estimated position of the mobile device in an indoor area, and updating an estimated position of the mobile device based on the motion information and indoor floor map information.

According to yet another aspect, a mobile device can include a local database. The local database generates a local position database for positioning based on WLAN access point signals measured by the mobile device at the updated positions within the indoor areas. A mobile device can also transmit the data in the local position database to a remote database. The data in the remote database are provided by the mobile device and a plurality of other mobile devices. The remote database generates a remote position database for positioning based on WLAN access point signals measured by the mobile device at the updated positions within the indoor areas. When a mobile device within the indoor areas initiates location-based tasks such as store finding, the mobile device can estimate a position by accessing a local or remote position database.

Details of one or more implementations are set forth in the accompanying drawings and the description below. Other features, objects, and advantages may be apparent from the description and drawings, and from the claims.

DETAILED DESCRIPTION

Figure 1:
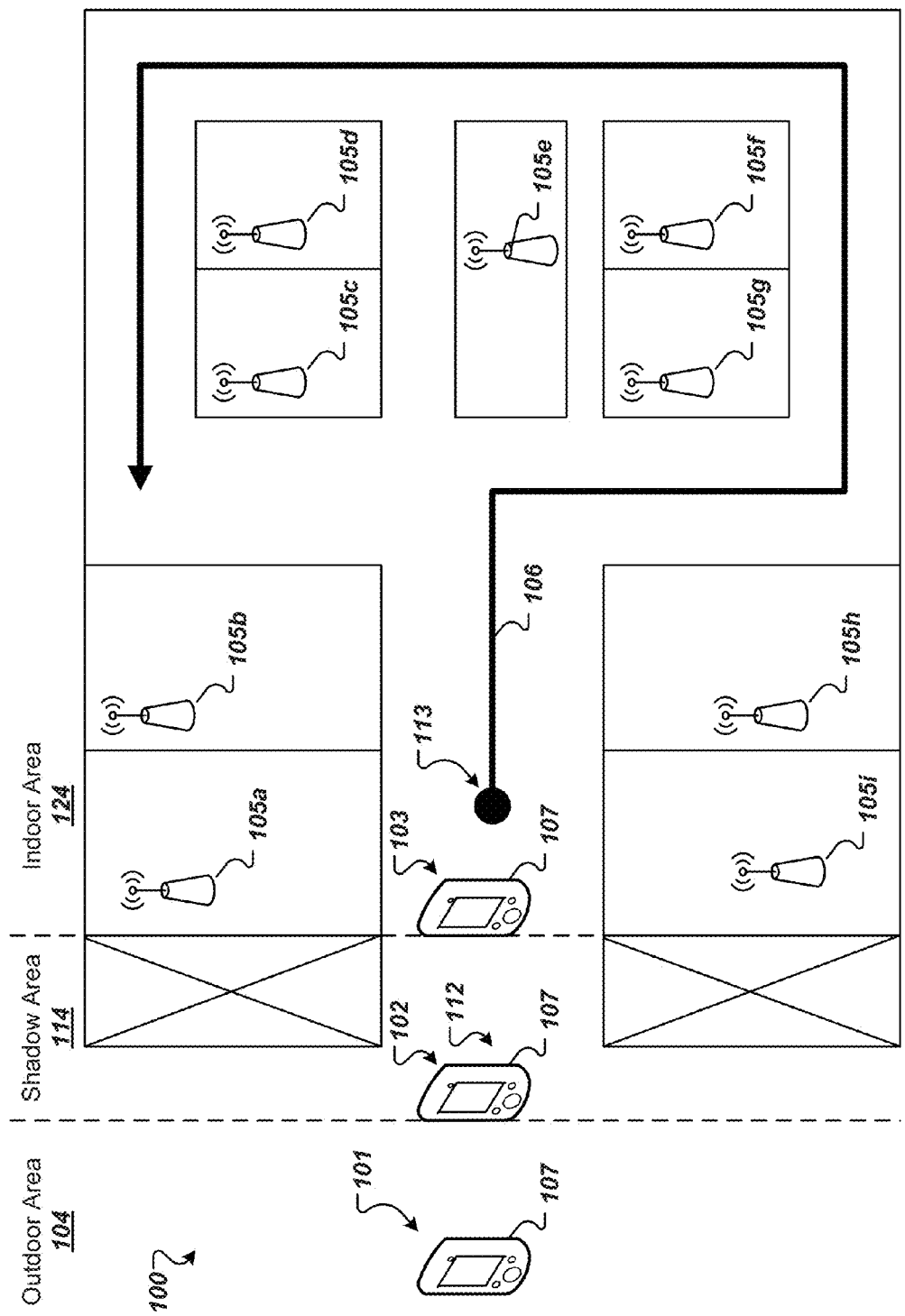
FIG. 1 is a diagram illustrating an example of determining a position of a mobile device as the mobile device moves from an outdoor area to an indoor area.

FIG. 1 is a diagram 100 illustrating an example of determining a position of a mobile device 107 as the mobile device 107 moves from an outdoor area 104 to an indoor area 124. Diagram 100 illustrates the mobile device 107 at four positions 101, 102, 103, 113. The mobile device 107 can include a global positioning system (GPS) receiver and of a wireless local area network (WLAN) transceiver. The GPS receiver may sample signals from one or more GPS satellites. The WLAN transceiver may measure signals transmitted by WLAN access points 105a-105i. Access points 105a-105i can be access points of a WiFi network, which implements an Institute of Electrical and Electronics Engineers (IEEE) 802.11 based protocol (e.g., IEEE 802.11n). An access point 105a-105i can broadcast a beacon signal providing an identifier (e.g., medium access control (MAC) address) for the mobile device 107 to connect to it when the mobile device 107 is within a communication range of the access point 105a-105i. In turn, a plurality of access points 105a-105i can be available to the mobile device 107 for connection. Those identifiers need not be associated with access points 105a-105i to which mobile device 107 are connected or can connect. In practice, a mobile device 107 at a particular place (e.g., an airport) can be within communication range of between at least one to twenty access points. Mobile device 107 may be capable of connecting to fewer than all of the access points 105a-105i (due to, for example, security setting of the access points 105a-105i and mobile device 107). Mobile device 107 can be actively connected to one of fewer access points, or no access points at all. However, all identifiers of the access points 105a-105i received by mobile device 107 can be used in determining a position of a mobile device 107.

The mobile device 107 may use GPS satellite signals to determine that the mobile device 107 is in an external environment. The outdoor area 104, shadow area 114, and indoor area 124 can be registered during the movement of the mobile device 107. The operations of environment determination by an environment profile sensor are described in conjunction with FIG. 2.

While in the outdoor area 104, GPS satellite signals can be used for determining an absolute position 101 of the mobile device 107. After the mobile device 107 determines an absolute position 101, the mobile device 107 moves within the outdoor area 104. The mobile device 107 thereby continues to determine the absolute positions based on GPS satellite signals.

The shadow area 114 (e.g., near a building) may exist between the outdoor area 104 and the indoor area 124. When the mobile device 107 moves to the shadow area 114 (e.g., at position 102), the mobile device 107 may still be able to receive GPS satellite signals for determining an absolute position 102 and may measure signals transmitted by a plurality of WLAN access points 105a-105i. The mobile device 107 can estimate a reference position 112 by using determined absolute position 102 and received WLAN access point signals. After the mobile device 107 determines an absolute position 102 and estimates a reference position 112, the mobile device 107 moves in the shadow area 114. The mobile device 107 thereby continues to determine the absolute positions and to estimate the reference positions. The mobile device 107 can collect the determined absolute positions and estimated reference positions and uses linear regression to model this set of position information.

When the mobile device 107 moves to the indoor area 124 (e.g., at position 103), the mobile device 107 calculates regressive coefficients using a least squares algorithm based on the collected position information, and measures signals transmitted by a plurality of WLAN access points 105a-105i. The mobile device 107 determines an estimated position 103 by using calculated regressive coefficients and received WLAN access point signals. After the mobile device 107 determines an estimated position 103, the mobile device 107 moves in the indoor area 124. To accurately trace the mobile device's trajectory 106, the mobile device 107 needs to refine the estimated position 103. The mobile device 107 can receive motion information from a Microelectromechanical Systems (MEMS) sensors register and indoor floor map information from a map database. This set of information allows the mobile device 107 to determine the updated position 113.

Figure 2:
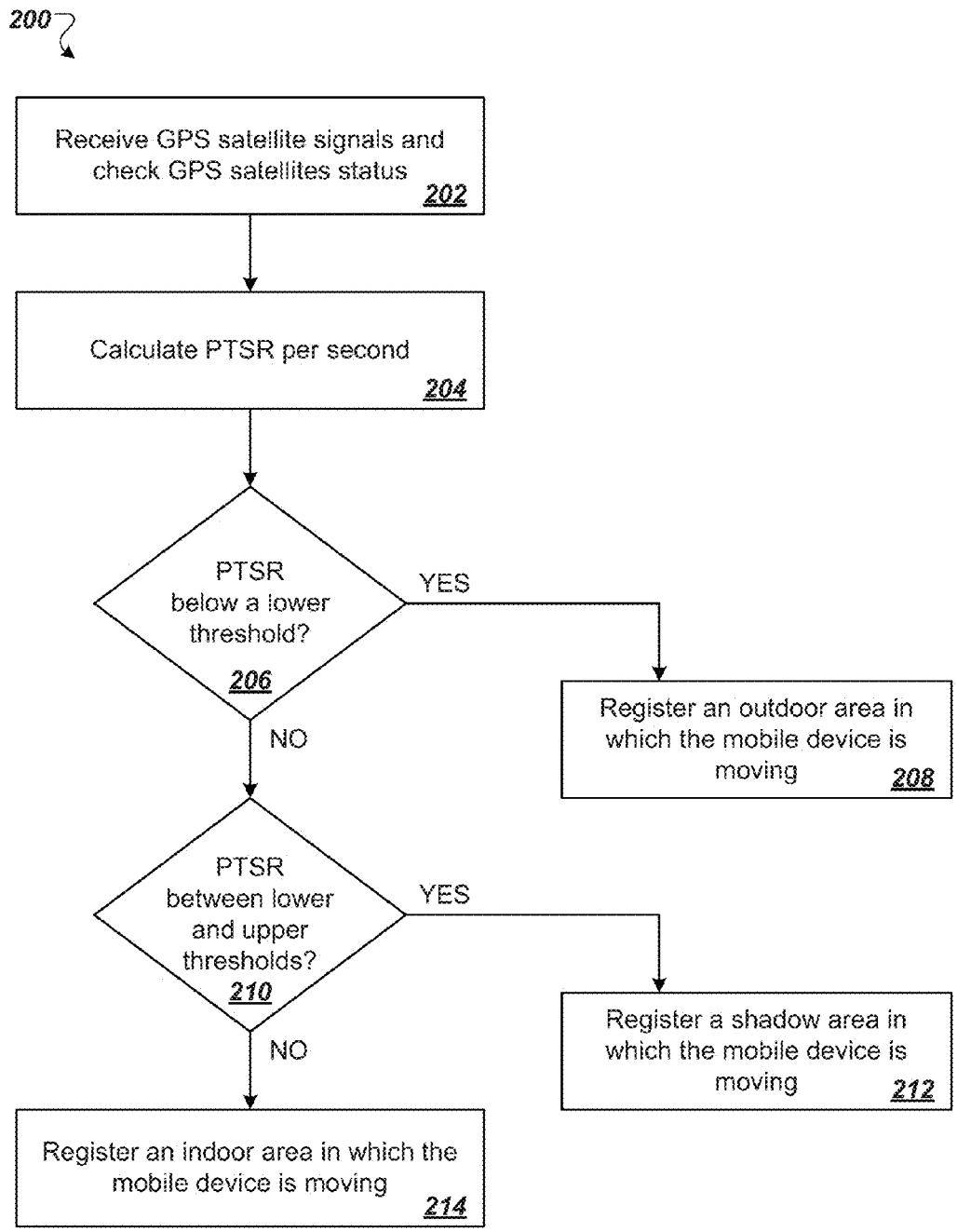
FIG. 2 is a flowchart illustrating an example of operations for registering a device's environment area based on GPS satellite signals.

FIG. 2 is a flowchart illustrating an example of operations 200 for registering a mobile device's environment area based on GPS satellite signals. At 202, the mobile device receives the signals from four or more GPS satellites and checks GPS satellite status including the time from start to first fix, the maximum number of captured satellites, the pseudo random number for each of the captured satellites, the carrier-to-noise density for each of the captured satellites, and other functional status. At 204, the mobile device calculates a Poor-to-Total Satellites Ration (PTSR) value per second to detect which area the mobile device is moving within. The PTSR is defined as a ratio of the total number of captured satellites and the number of captured satellites with carrier to noise density below a threshold. If the calculated PTSR is below a lower threshold at 206, the mobile device registers that the mobile device is moving in an outdoor area at 208. If the calculated PTSR is between lower and upper thresholds at 210, the mobile device registers that the mobile device is moving in a shadow area at 212. If the calculated PTSR is above the upper threshold, the mobile device registers that the mobile device is moving in an indoor area at 214. A dwell time at 208, 212, and 214 is designated to avoid a ping-pong effect on the environment determination, when a mobile device moves back and forth between two different environment areas.

Figure 3:
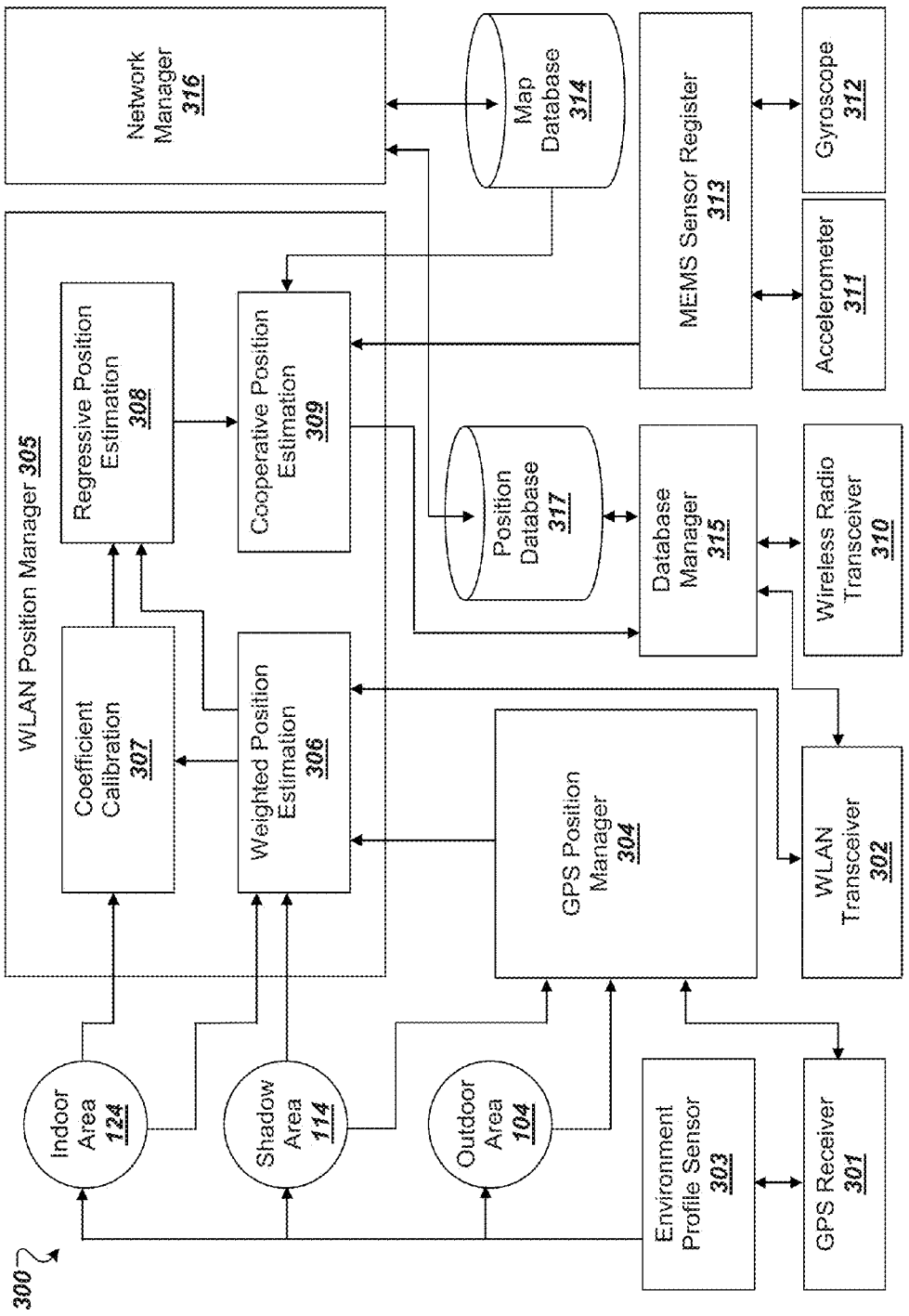
FIG. 3 is a block diagram illustrating an example of a system for providing position information.

FIG. 3 is a block diagram illustrating an example of a system 300 for providing position information as a mobile device (e.g., mobile device 107 of FIG. 1) moves from an outdoor area to an indoor area. The system 300 can be implemented on any type of mobile device, including a mobile phone, smart phone, or tablet computing device. A mobile device can include hardware including, but not limited to, a processor and memory for executing and storing instructions, software including one or more applications and an operating system. The mobile device may have multiple processors and multiple shared or separate memory components.

As illustrated in FIG. 3, system 300 includes a series of elements, each of which acts to provide specific functionality. These elements include software which is stored in a memory and then executed on a processor to provide the functionality, hardware which is adapted to provide the element's functionality, or a combination of software and hardware which work together to provide the element's functionality.

The system 300 can include a GPS receiver 301 and a WLAN transceiver 302, each of which provides information for position determination. The GPS receiver 301 provides an interface through which the mobile device accesses the medium to communicate with one or more satellites. The GPS receiver 301 receives signals transmitted by the satellites. The WLAN transceiver 302 provides an interface through which the mobile device accesses the wireless medium to communicate with one or more access points. The WLAN transceiver 302 measures signals transmitted by the access points and derives signal strength, i.e., received signal strength indicator (RSSI), from the received signals.

The system 300 may include an environment profile sensor 303 that is configured to receive satellite signals delivered by GPS receiver 301. Based on GPS satellite signals, the environment profile sensor 303 registers a device's environment area in which the mobile device is moving. The operations of the environment profile sensor 303 are described in according with FIG. 2.

The system 300 may include a GPS position manager 304. When the environment profile sensor 303 registers an outdoor area 104, the GPS position manager 304 may provide an absolute position of the mobile device, for example, at position 101 of FIG. 1. The GPS position manager 304 receives satellite signals delivered by GPS receiver 301, determines the transit time of each of satellite signals, and calculates its distances to the satellites by using the speed of light. The GPS position manager 304 can use the calculated distances, the positions of the satellites, and navigation equations to determine an absolute position of the mobile device when provided with unobstructed view of at least four of the satellite signals. The absolute position can be represented by geographic coordinates that include a latitude coordinate, a longitude coordinate, and an altitude coordinate.

When the environment profile sensor 303 registers a shadow area 114, the GPS position manager 304 may provide an absolute position of the mobile device, for example, at position 102 of FIG. 1. The system 300 may include a WLAN position manager 305 that is configured to receive information from GPS position manager 304 and WLAN transceiver 302. This information consists of an absolute position (e.g., a position 102 of FIG. 1) and the strength of received WLAN access point signals. This set of information allows the WLAN position manager 305 to estimate the reference position of the mobile device, for example, at position 112 of FIG. 1.

The WLAN position manager 305 may include a weighted position estimation unit 306 that estimates the reference position of the mobile device based on the strength of received WLAN access point signals and the position information provided by GPS position manager 304. The reference position can be represented by geographic coordinates that include a latitude coordinate and a longitude coordinate. Further details of determining the reference position of the mobile device will be discussed below in reference to FIG. 4.

After the weighted position estimation unit 306 has estimated the reference position of the mobile device, it gathers both absolute and reference positions and conveys to a coefficient calibration unit 307 coupled to the WLAN position manager 305. The coefficient calibration unit 307 may model both absolute and reference positions by linear regression.

When the environment profile sensor 303 registers an indoor area 124, the coefficient calibration unit 307 calculates the regressive coefficients in the linear regression model by least squares algorithm and optimizes the calculated regressive coefficients by an iterative method. A regressive position estimation unit 308, coupled to the WLAN position manager 305, may receive information from weighted position estimation unit 306 and coefficient calibration unit 307. This information consists of a reference position and the calculated regressive coefficients. This set of information allows the regressive position estimation unit 308 to estimate the mobile device's position, for example, at position 103 of FIG. 1. The mobile device's position can be represented by geographic coordinates that include a latitude coordinate and a longitude coordinate The system 300 may include one or more wireless radio transceiver 310, an accelerometer 311, a gyroscope 312, and a map database 314 in order to provide supplemental positioning information when the mobile device moves in an indoor area 124. The wireless radio transceiver 310 may be a cellular transceiver operating according to a communication standard including, but not limited to, Global System for Mobile Communications (GSM), Wideband Code Division Multiple Access (WCDMA), and Long-Term Evolution (LTE), or a personal area network transceiver including, but not limited to, Bluetooth, Zigbee, a frequency modulation transceiver, and a digital television transceiver. The wireless radio transceiver 310 provides an interface through which the mobile device accesses the wireless medium to communicate with one or more base stations. The wireless radio transceiver 310 may measure signals transmitted by base station, derive signal strength, i.e., RSSI, from the received signals.

The accelerometer 311 is an example of microelectromechanical systems (MEMS) sensors that may serve as a motion speed detector. The accelerometer 311 reports an acceleration magnitude that may be used to detect whether the mobile device is currently moving or standing still. The accelerometer 311 provides an interface through which MEMS sensor register 313 accesses the acceleration magnitude. The MEMS sensor register 313 may include a memory that stores a record of at least some of the acceleration magnitude. The gyroscope 312 is an example of MEMS sensors that may be used to detect an orientation of movement of the mobile device. The gyroscope 312 provides an interface through which MEMS sensors register 313 accesses the gyroscope reading and stores a record of at least some of the gyroscope reading in a memory.

The map database 314 may provide information defining the structure of link, node, and region of an indoor floor map. Link presents a passageway which the mobile device can move along. Region presents an area which the mobile device can move within a boundary. Node presents the connection between link and link, or link and region. The map database 314 can be organized under a hierarchical folder structure, the folders mapping to directories in the file system. In some implementations, the map database 314 can be hosted locally in relation to system 300. In some implementations, the map database 314 can be hosted remotely (e.g., on a server) in relation to system 300 and accessible to the mobile device through a network manager 316.

The system 300 may include a cooperative position estimation unit 309 coupled to the WLAN position manager 305 that is configured to gather the inputs including position information provided by the regressive position estimation unit 308, motion information provided by MEMS sensor register 313, and indoor floor map information provided by the map database 314. The cooperative position estimation unit 309 may determine and update the position information provided by the regressive position estimation unit 308 based on motion information and indoor floor map information. Further details of determining and updating the estimated position of the mobile device will be discussed below in reference to FIG. 5.

The system 300 may include a database manager 315. The database manager 315 collects the position information from the cooperative position estimation function 309, the signal information from wireless radio transceiver 310, and the signal information from WLAN transceiver 302. The signal information from wireless radio transceiver 310, such as a cellular transceiver, can include Mobile Country Code (MCC), Mobile Network Code (MNC), Local Area Code (LAC), cell identifier (cell id), and the strength of received cell signal. The signal information from WLAN transceiver 302 can include MAC address and the strength of received access point signal. The database manager 315 may include a memory that stores a record of at least some of the signal information associated with the position information. The database manager 315 provides an interface through which a position database 317 can access and provide the collected information.

The system 300 may include a position database 317. The position database 317 stores the collected information provided by the database manager 315 and can be organized under a hierarchical folder structure, the folders mapping to directories in the file system. The position database 317 can be hosted locally in relation to system 300. In some implementations, the position database 317 may provide the collected information to a remote database (e.g., on a server) through a network manager 316.

The system 300 includes a network manager 316 that is configured to establish and maintain network connections (e.g., software for implementing a communication protocol, such as transmission control protocol/internet protocol (TCP/IP), or hypertext transfer protocol (HTTP)) through WLAN access point or cellular networks, such as WCDMA or LTE.

In some implementations, the system 300 may continuously determine the position information based on the motion information and the indoor floor map information as the mobile device moves in an indoor area, and provide the determined position associated with wireless radio signal information to the database. The system 300 can host a database locally. The local database generates a local position database 317 for positioning based on WLAN access point signals measured by the mobile device at the updated positions within the indoor area. In other implementations, when a mobile device within the indoor area initiates location-based tasks such as store finding, the system 300 can estimate a position by accessing a local position database. Different implementations of the system 300 may provide different levels of operations. The operations may trade off the amount of data and the amount of computation and memory required at the mobile device.

In some implementations, the system 300 can transmit the data in the local position database 317 to a remote database through a network manager 316. The data in the remote database are provided by the mobile device and a plurality of other mobile devices. The remote database generates a remote position database for positioning based on WLAN access point signals measured by the mobile device at the updated positions within the areas of the indoors. In other implementations, when a mobile device within the area of the indoors initiates location based tasks such as store finding, the mobile device can estimate a position by accessing a remote position database. Different implementations of the system 300 may provide different levels of operations. The operations may trade off the amount of data and the amount of computation and memory required at the mobile device.

Figure 4:
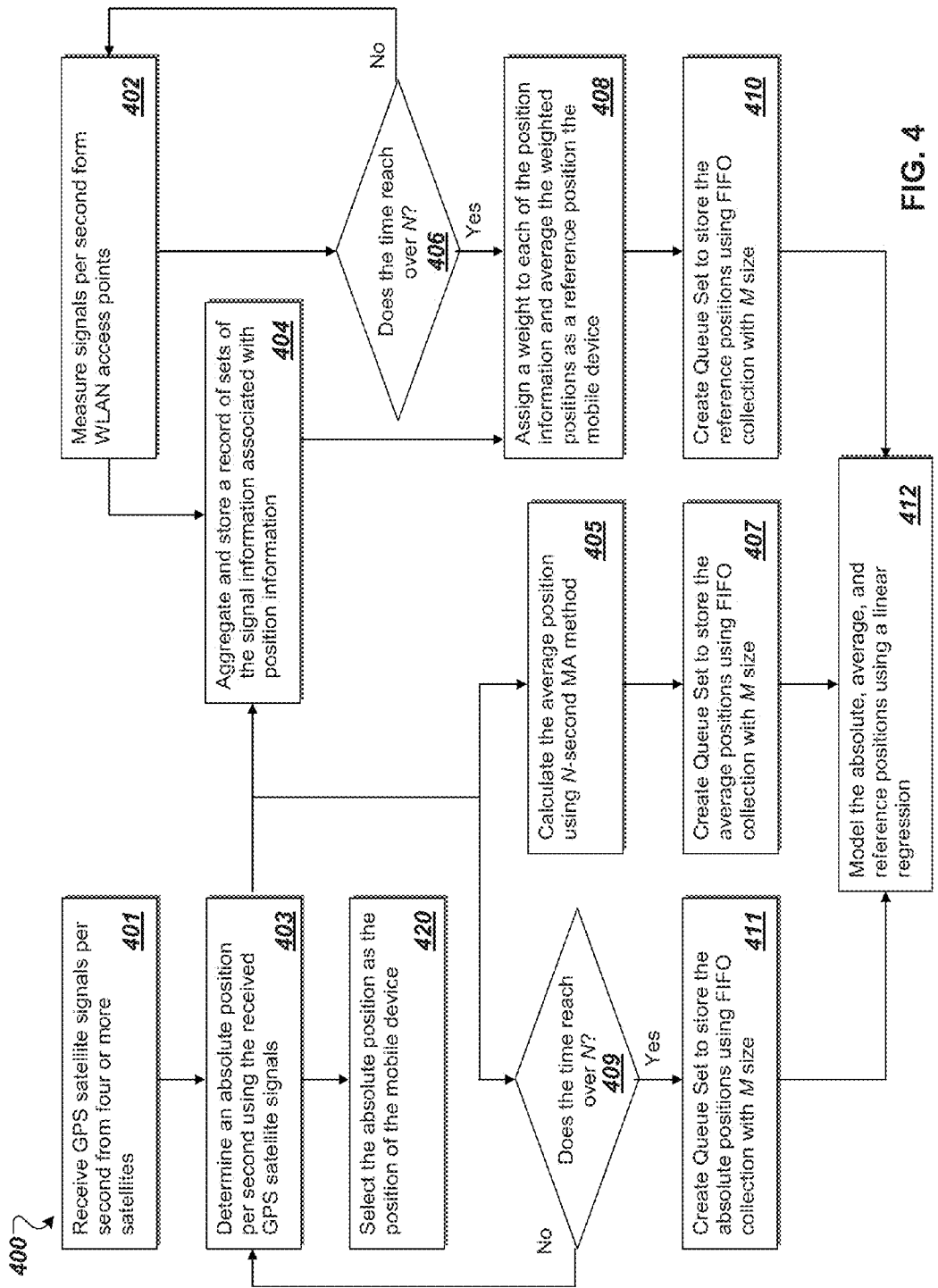
FIG. 4 is a flowchart illustrating an example of operations for providing position information as the mobile device moves to a shadow area.

FIG. 4 is a flowchart illustrating an example of operations 400 for providing position information as a mobile device moves to a shadow area. The operations 400 will be described in reference to system 300 of FIG. 3 that performs the operations 400.

When the environment profile sensor 303 registers a shadow area, the mobile device receives GPS satellite signals per second from four or more satellites (at 401) and determines an absolute position per second using the received GPS satellite signals (at 403). At 420, the determined absolute position can be selected as a position of the mobile device (e.g., at position 102 of FIG. 1).

At 405, the mobile device calculates the average position by N-second moving average (MA) method. The N can be an integer value (e.g., 5 seconds). Calculating the average position can include calculating an average of latitudes and longitudes of absolute positions and designating a position at the calculated average latitude and longitude as the average position. At 407, the mobile device creates a queue set that implements First-in First-out (FIFO) collection with M size in order to store the average positions provided by 405. At 411, the mobile device can also create a queue set that implements FIFO collection with M size to store the absolute positions provided by 403, if the time reaches over N (at 409).

When the environment profile sensor 303 registers a shadow area, the mobile device measures signals per second from WLAN access points (at 402) The signal includes a MAC address and the strength of received signal. At 404, the mobile device aggregates the position information provided by 403 and the signal information provided by 401 and stores a record of sets of the signal information associated with position information in a temporary data repository. The temporary data repository hosted on the mobile device can include MAC addresses (i.e., the identifiers of WLAN access points), strength of received signals (i.e., RSSI), and corresponding latitude and longitude coordinates.

At 408, the mobile device can estimate a reference position of the mobile device (e.g., at position 112 of FIG. 1), if the time reaches over N (at 406). The mobile device can perform a lookup table of the temporary data repository using MAC addresses of the current WLAN access points within a communication range of which the mobile device is located to determine whether the current WLAN access points are included in the records of the temporary data repository. The estimation of the reference position includes assigning a weight to each of the absolute positions of the mobile device and averaging the weighted positions as a reference position of the mobile device. Assigning a weight to each of the absolute positions can include assigning a weight to each of latitudes and longitudes of the absolute positions. The weight of an absolute position can be determined by the strength of received WLAN access point signals. Calculating the average position can include calculating an average of weighted latitudes and weighted longitudes of the absolute positions and designating a position at the calculated average latitude and longitude as the average position. At 410, the mobile device creates a queue set that implements FIFO collection with M size in order to store the reference positions provided by 408.

At 412, the mobile device can model the set of absolute positions provided by 411, the set of average positions provided by 407, and the set of reference positions provided by 410 by a linear regression formula.

Figure 5:
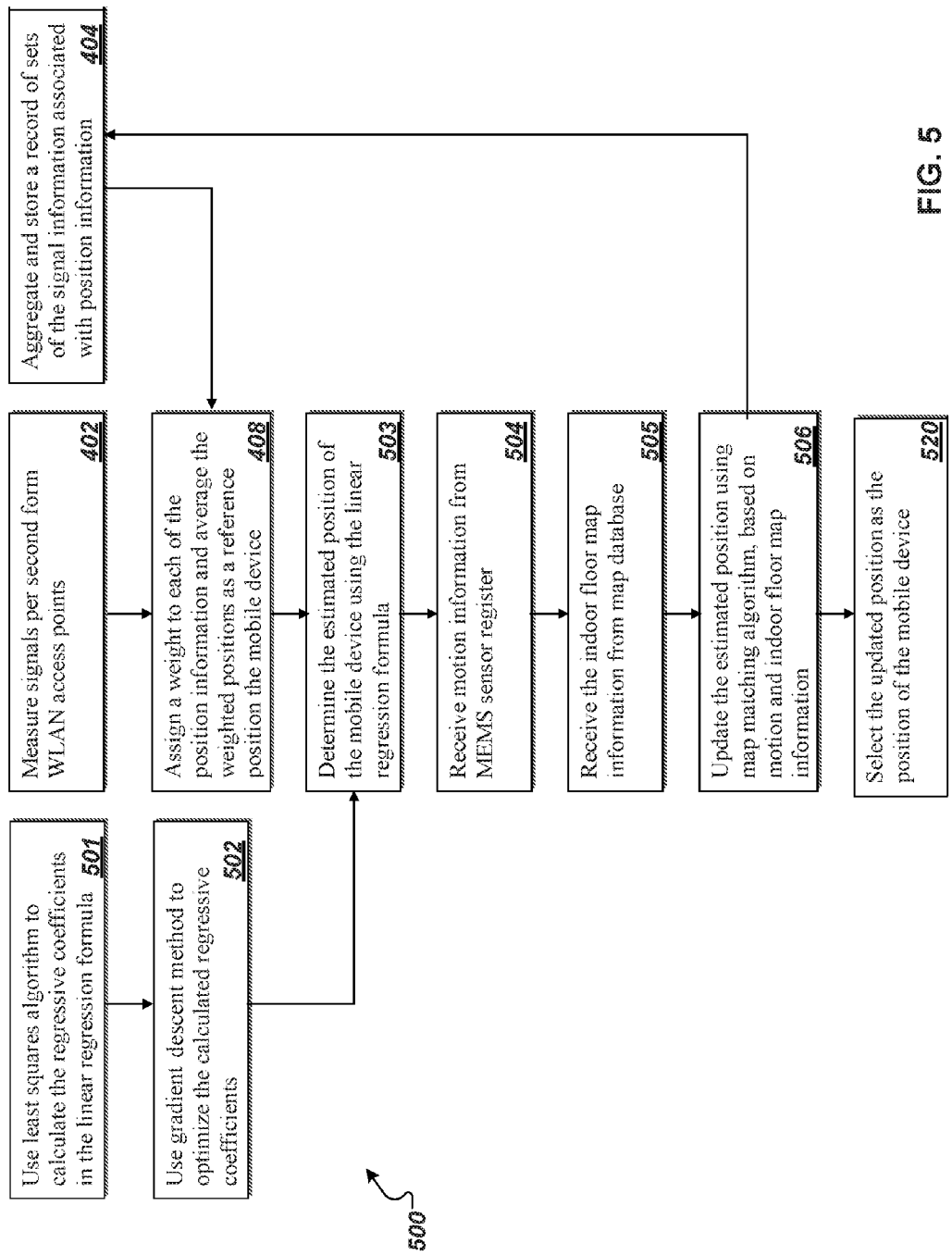
FIG. 5 is a flowchart illustrating an example of operations for providing position information as the mobile device moves to an indoor area.

FIG. 5 is a flowchart illustrating an example of operations 500 for providing position information as the mobile device moves to an indoor area. The operations 500 will be described in reference to system 300 of FIG. 3 that performs the operations 500.

When the environment profile sensor 303 registers an indoor area 124, the mobile device calculates the regressive coefficients in the linear regression formula by least squares algorithm (at 501) and optimizes the calculated regressive coefficients by gradient descent method (at 502). The gradient descent method is iterative algorithm to yield a best solution. In some implementations, the iterative optimization can be satisfied when the gradient's magnitude reaches below a threshold value. In some implementations, the iterative optimization can be satisfied when a number of iterations reach a threshold number.

At 503, the mobile device receives the reference position provided by 408 and the optimized regressive coefficients provided by 502. This set of information allows the mobile device to estimate the mobile device's position (e.g., at position 103 of FIG. 1). The estimated position does not generally place the mobile device within the mobile device's trajectory.

At 504, the mobile device receives the motion information from MEMS sensor register 313. The motion information includes a record of at least some of the acceleration magnitude that can be used to detect the mode of the mobile device (e.g., the mobile device is moving or standing still). The motion information also includes a record of at least some of the gyroscope reading that can be used to detect the orientation of movement of the mobile device. At 505, the mobile device receives the indoor floor map information from map database 314. For positioning purpose, map data are abstracted to the entities of node, link and region.

At 506, the mobile device can update the estimated position of the mobile device by map matching algorithm, based on the motion information and the indoor floor map information. In some implementations, when the mobile device is standing still, the mobile device may not continuously determine and update the estimated position of the mobile device by applying the indoor floor map information. In some implementations, when the mobile device is moving, the mobile device may apply the indoor floor map information to continuously refine the estimated position of the mobile device. For example, the estimated position does not place the mobile device on a link as defined in the map database 314. The map matching algorithm may reckon the estimated position of the mobile device (e.g., position 103 of FIG. 1) to be the nearest position (e.g., position 113 of FIG. 1) within a link (e.g., within the mobile device's trajectory).

Map matching algorithm is based on hypothesis that the mobile device can move along a link or within the boundary of a region. Thus, the estimated position of the mobile device may be matched to a link or a region. The point to link method is applied with topologic relationships considered. In each epoch, the input data to map matching includes the estimated position and the orientation of the mobile device. Given an accurate indoor floor map, the map matching algorithm can be performed effectively. In many indoor areas (e.g., a mall building), there are a limited number of possible links. Even with relatively inaccurate position information, the correct link can be determined using the map matching algorithm.

At 520, the updated position can be selected as a position of the mobile device (e.g., at position 113 of FIG. 1).

The features as described in reference to FIGS. 1-5 can be implemented in one or more computer programs that are performed by a processing system, including at least one programmable processor coupled to received data and instructions from, and to transmit data and instructions, to a data storage system, at least one input device, and at least one output device. A computer program is sets of instructions that can be used, directly or indirectly, in a computer to perform a certain activity or bring about a certain result. A computer program can be written in any form of programming language (e.g., Java, Objective-C), including compiled or interpreted languages, and can be deployed in any form, including as a stand-alone program or as a module, component, a browser-based web application, or other unit suitable for use in a computing environment.

The features can be performed in a computer system that can include a back-end component (e.g., a data server), or that can include a middleware component (e.g., an application server), or that can include a front-end component (e.g., a computer having a graphical user interface or an Internet browser, or any combination of them). The components of the system can be connected by any form or medium of data communication networks. In some implementations, communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A few implementations have been described in detail above, and various modifications are possible. While this specification contains many specifics, these should not be construed as limitations on the scope of what may be claimed, but rather as descriptions of features that may be specific to particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations. Other implementations fall within the scope of the following claims.

What is claimed is:

1. A mobile device comprising:
a global positioning system (GPS) receiver that receives GPS satellite signals;
a wireless local area network (WLAN) transceiver that measures WLAN access point signals; and
an environment profile sensor that calculates a Poor-to-Total Satellites Ratio (PTSR), wherein the PTSR is defined as a ratio of a total number of captured satellites and a number of captured satellites with a carrier-to-noise density below a threshold, to determine an environment area in which the mobile device is located, the environment profile sensor to:
register an outdoor area if the calculated PTSR is below a lower threshold;
register a shadow area if the calculated PTSR is between the lower threshold and an upper threshold; and
register an indoor area if the calculated PTSR is over the upper threshold.

2. The mobile device of claim 1, further comprising a GPS position manager for determining an absolute position of the mobile device based on GPS satellite signals as the mobile device moves from the outdoor area to the indoor area.

3. The mobile device of claim 1, further comprising a WLAN position manager that estimates a reference position of the mobile device based on an absolute position and received WLAN access point signals as the mobile device moves to the shadow area.

4. The mobile device of claim 3, wherein a weight of the absolute position is determined by strengths of the received WLAN access point signals.

5. The mobile device of claim 1, further comprising a WLAN position manager including:
a coefficient calibration unit that calculates regressive coefficients of a linear regression formula using a least squares algorithm based on an absolute position and an estimated reference position;
a regressive position estimation unit that determines an estimated position of the mobile device based on the calculated regressive coefficients and received WLAN access point signals; and
a cooperative position estimation unit that updates the estimated position of the mobile device based on motion information provided by a microelectromechanical systems (MEMS) sensor register and indoor floor map information provided by a map database as the mobile device moves to the indoor area.

6. The mobile device of claim 5, wherein the coefficient calibration unit iteratively uses a gradient descent method to optimize the regressive coefficients.

7. The mobile device of claim 5, wherein the regressive position estimation unit uses the optimized regressive coefficients to determine the estimated position of the mobile device.

8. The mobile device of claim 5, wherein the cooperative position estimation unit uses a point to link matching method for applying the indoor floor map information to update the estimated position of the mobile device.

9. The mobile device of claim 1, further comprising a MEMS sensor register that receives acceleration magnitude information from an accelerometer and gyroscope information from a gyroscope.

10. The mobile device of claim 9, wherein the acceleration magnitude information is used to detect a mode of the mobile device.

11. The mobile device of claim 9, wherein the gyroscope information is used to detect orientation of movement of the mobile device.

12. The mobile device of claim 1, further comprising a map database for storing indoor floor map data associated with structures of link, node, and region.

13. The mobile device of claim 1, further comprising a database manager that collects position data, each of the position data includes an updated position associated with signal information from the WLAN transceiver or signal information from a wireless radio transceiver.

14. The mobile device of claim 13, wherein the wireless radio transceiver comprises one of a cellular transceiver, Bluetooth transceiver, or Zigbee transceiver.

15. The mobile device of claim 1, further comprising a position database for storing one or more position data for use in determining a position.

16. The mobile device of claim 1, further comprising a network manager that establishes a network connection for transmitting position data to a positioning server or for receiving map data from a map server.

17. A method comprising:
calculating, by an environment profile sensor, a Poor-to-Total Satellites Ratio (PTSR) based on global positioning system (GPS) satellite signals received by a mobile device, wherein the PTSR is defined as a ratio of a total number of captured satellites and a number of captured satellites with a carrier-to-noise density below a threshold;
determining that the mobile device is in an outdoor area if the calculated PTSR is below a lower threshold;
determining that the mobile device is in a shadow area if the calculated PTSR is between the lower threshold and an upper threshold; and
determining that the mobile device is in an indoor area if the calculated PTSR is above the upper threshold.

18. A method comprising
determining, by a global positioning system (GPS) position manager executed by one or more processors, an absolute position of a mobile device based on GPS satellite signals received by the mobile device as the mobile device moves from an outdoor area to an indoor area;
calculating regressive coefficients of a linear regression formula using a least squares algorithm based on the determined absolute position and an estimated reference position;
determining an estimated position of the mobile device based on the calculated regressive coefficients and wireless local area network (WLAN) access point signals received by the mobile device; and
updating the estimated position of the mobile device based on motion information provided by a microelectromechanical systems (MEMS) sensor register and indoor floor map information provided by a map database as the mobile device moves to the indoor area.

19. The method of claim 18, further comprising estimating the reference position of the mobile device based on the determined absolute position and WLAN access point signals received by the mobile device as the mobile device moves to a shadow area.

20. The method of claim 19, wherein a weight of the absolute position is determined based on strengths of the WLAN access point signals received by the mobile device as the mobile device moves to the shadow area.

21. The method of claim 18, wherein the regressive coefficients are calculated iteratively optimized using a gradient descent method.

22. The method of claim 18, wherein the estimated position of the mobile device is updated using a point to link matching method for applying the indoor floor map information.

23. The method of claim 18, further comprising receiving acceleration magnitude from an accelerometer and gyroscope information from a gyroscope.

24. The method of claim 23, wherein the acceleration magnitude is used to detect a mode of the mobile device.

25. The method of claim 23, wherein the gyroscope information is used to detect orientation of movement of the mobile device.

26. The method of claim 18, further comprising storing indoor floor map data, the indoor floor map data being associated with structures of link, node, and region.

27. The method of claim 18, further comprising collecting position data, the position data includes an updated position associated with signal information from a WLAN transceiver or signal information from a wireless radio transceiver.

28. The method of claim 27, wherein the wireless radio transceiver comprises one of a cellular transceiver, a Bluetooth transceiver, or a Zigbee transceiver.

29. The method of claim 18, further comprising storing position data for use in determining a position of the mobile device.

30. The method of claim 18, further comprising establishing a network connection for transmitting position data to a positioning server, or for receiving map data from a map server.

31. The method of claim 18, further comprising:
    determining the absolute position of the mobile device by accessing a position database that is hosted locally by or remotely from the mobile device as the mobile device initiates location-based tasks while within the indoor area.

* * * * *